June 20, 1972  R. C. WICKER  3,671,131
LITHOGRAPHIC COLOR ANALYZER USING INTERFERENCE MAGNIFICATION
Filed Nov. 24, 1969  5 Sheets-Sheet 1

INVENTOR.
RALPH C. WICKER
BY
ATTORNEY

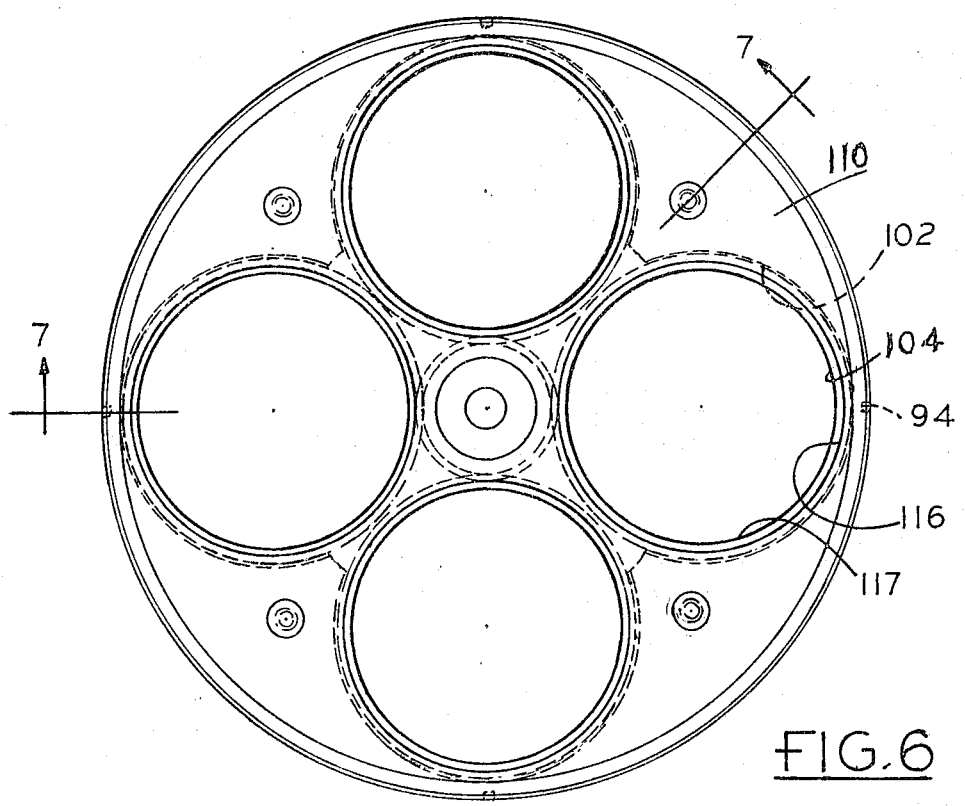

June 20, 1972 R. C. WICKER 3,671,131
LITHOGRAPHIC COLOR ANALYZER USING INTERFERENCE MAGNIFICATION
Filed Nov. 24, 1969 5 Sheets-Sheet 5

INVENTOR.
RALPH C. WICKER.
BY
ATTORNEY

United States Patent Office 3,671,131
Patented June 20, 1972

3,671,131
LITHOGRAPHIC COLOR ANALYZER USING
INTERFERENCE MAGNIFICATION
Ralph C. Wicker, Fairport, N.Y., assignor to Chesley F.
Carlson Company, Minneapolis, Minn.
Filed Nov. 24, 1969, Ser. No. 879,016
Int. Cl. G01j 3/52
U.S. Cl. 356—175                                        6 Claims

ABSTRACT OF THE DISCLOSURE

Lithographic color analyzer having a base with a viewing aperture and means for establishing a viewing plane for a lithographic print or the like, a casing having an inclined deck, a pair of manually rotatable turret disks pivotally mounted on the deck, one having four dark half tone screens rotatably mounted therein and of different periodicity and a density as great as 99½%, and the other having color filter disks, a lens system having a 1 to 1 ratio within the casing on a substantially horizontal axis, a reflector above the aperture and in alignment with and on one side of the lens system, and a second reflector below the deck in alignment with and on the other side of the lens system, the reflectors and lens system being disposed on an optical axis extending normal to the viewing plane and normal to the plane of said half tone screen with the optical distance between the viewing plane and the optical center of the lens system being the same as the optical distance from the lens system center to the half tone screen plane, illumination for the viewing plane, forced air circulation for cooling the casing and establishing an above atmospheric pressure therein, a viewing lens disposed above the deck and the dark screen plane, means for manually rotating the half tone screens relative to the turret in which they are mounted, and a dial indicator above the deck for indicating the angle of rotation of the half tone screen.

---

Figure 1:
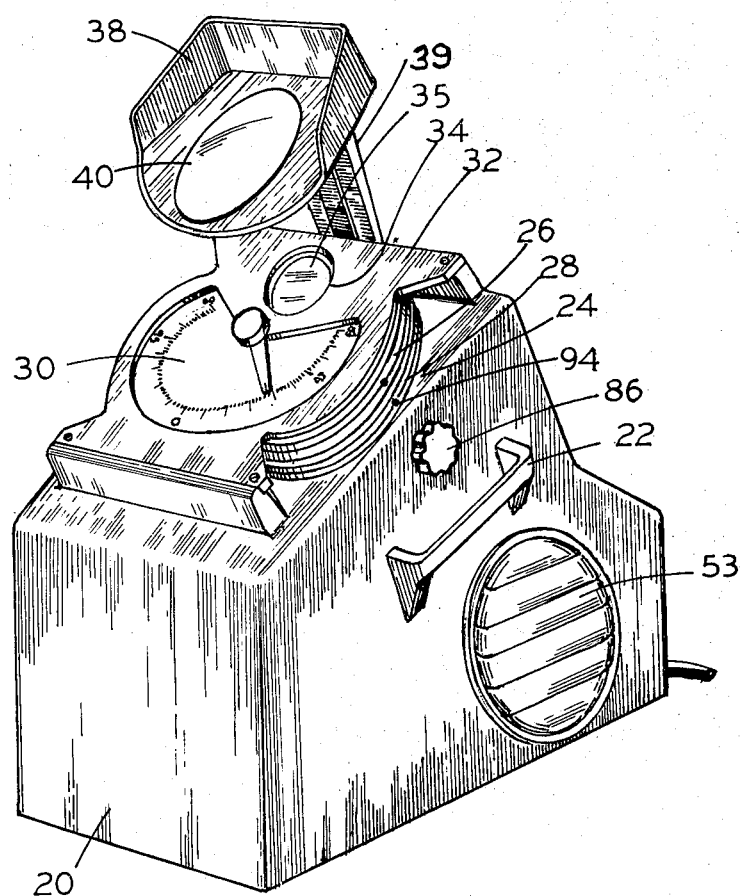

This invention relates to a color analyzer for use in lithographic color work.

The preparation of color lithographic printing plates, so as to accurately reproduce the color of objects on the printed sheet is of utmost importance. The analysis of a printed sheet to ascertain the reasons for failure to obtain accurate color reproductions has been a problem. Examination by the naked eye through high power lenses merely adds to the confusion. With dot multiplicity of 150 or 300 to the inch, at four different angles, such examination merely enlarges all colors to add to the confusion. In U.S. Pat. No. 3,256,770 there is disclosed a lithographic color analyzer utilizing what has been referred to as interference magnification through the use of a half tone screen, and the projection thereon of an image from a color sheet, both utilizing the same lithographic dot periodicity, wherein by creating a moire pattern, the dots of any color may be in effect interference magnified many times. While the dots of the remaining colors are so diffused as to remain in the background.

The present invention is directed to an improved apparatus wherein the analyzer is more compact, and in which provision is made for quickly changing the screen periodicity, and in which the screen is an extremely dark screen having apertures so small as to permit the image of the print to be seen in detail, as well as to provide the necessary interference magnification, improved strong illumination being provided with adequate cooling therefor. In addition provision is made to introduce any one of a number of color filters to further improve the viewing of one color and provide contrast and sharp definition. An enlarged scale is also provided to quickly show the screen angles between the various colors of a color print and make the selection of a color and examination thereof a rapid and exact sequence.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 2:
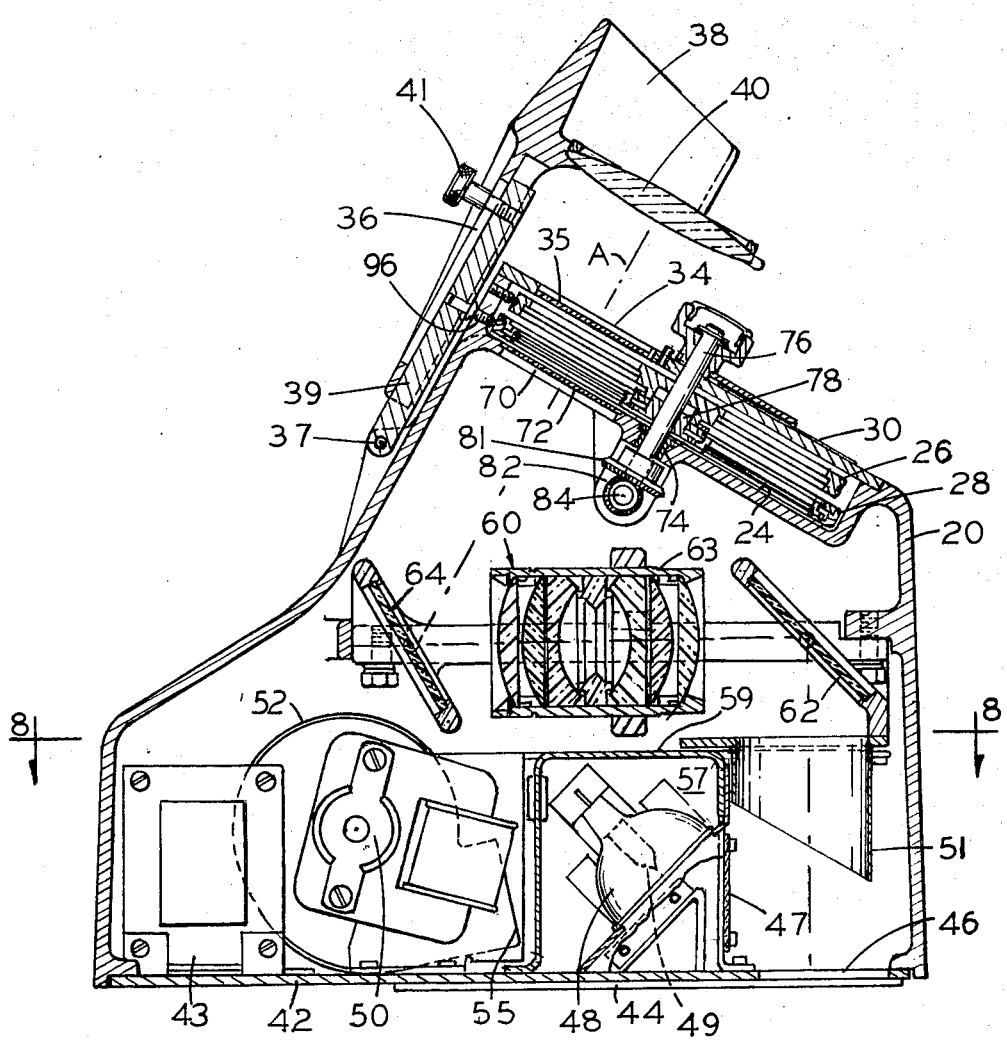
Figure 3:
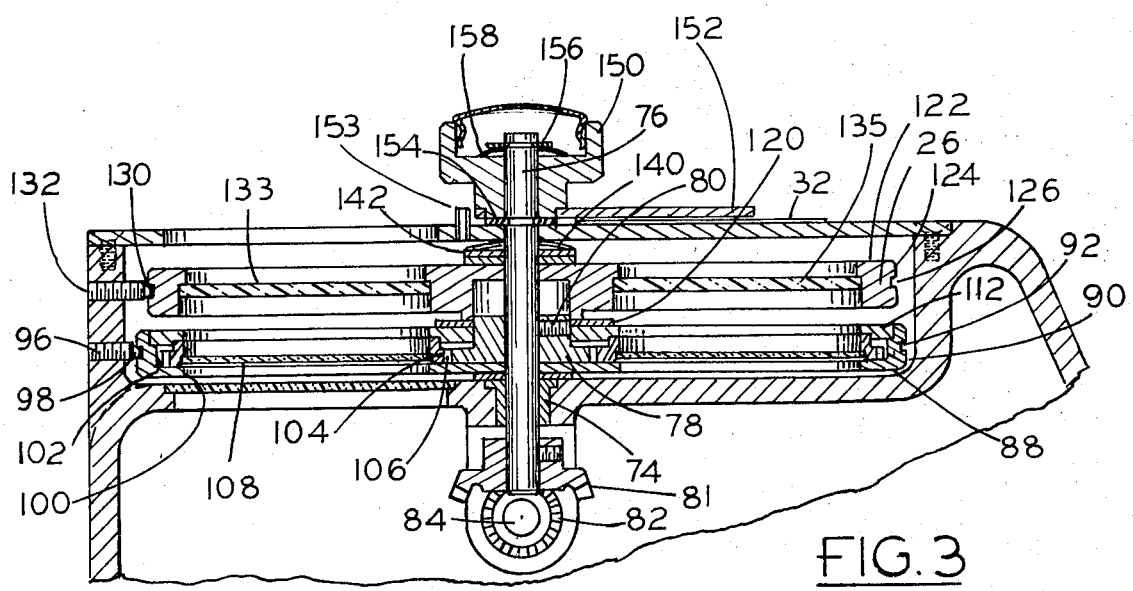
Figure 4:
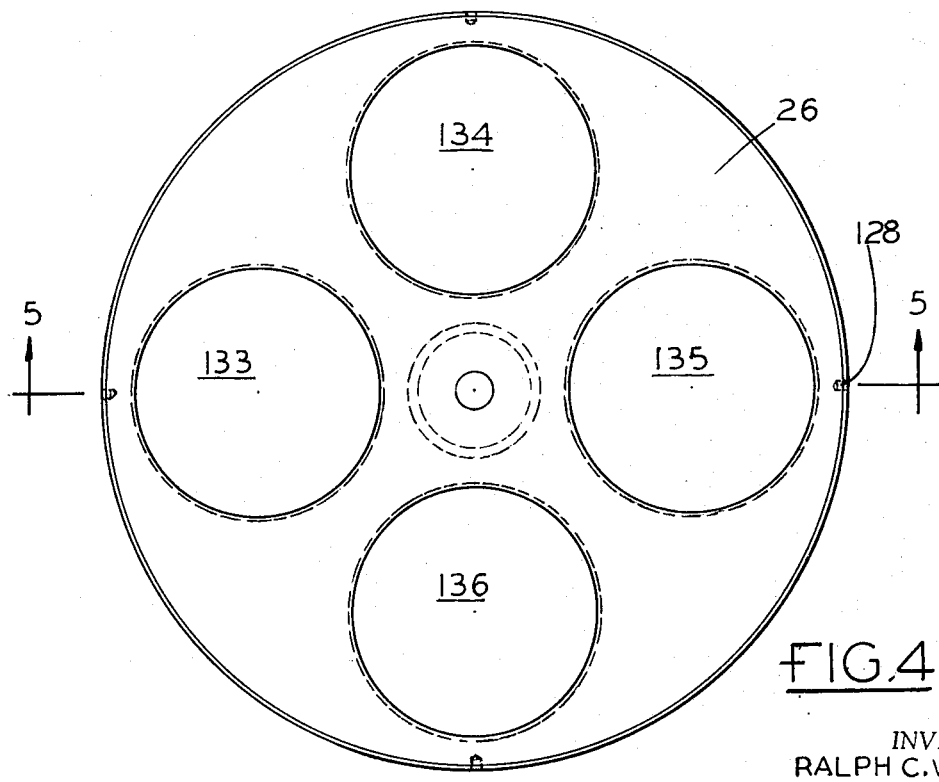
Figure 8:
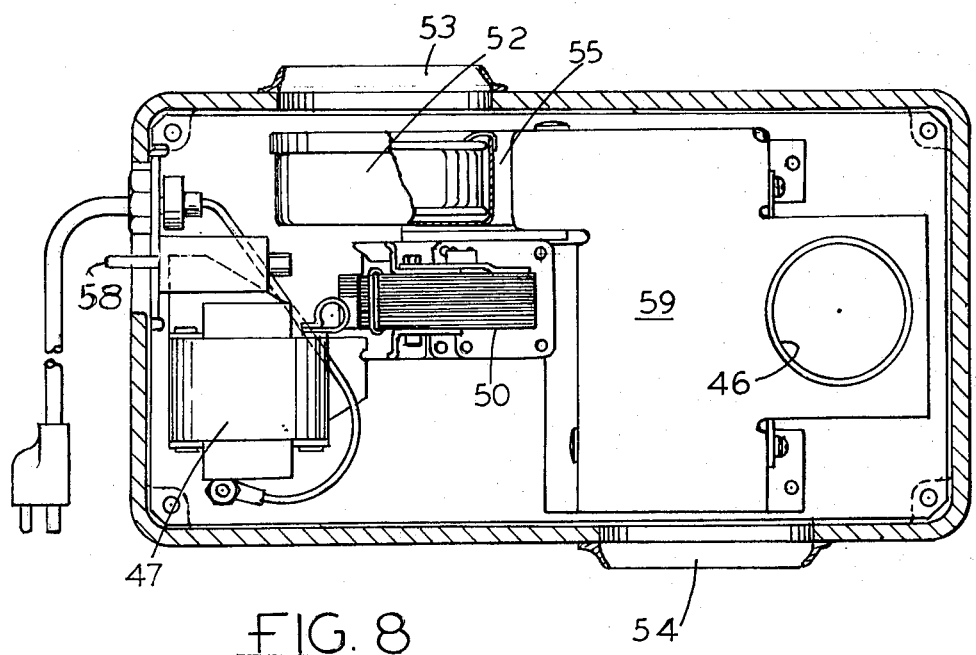

In the drawings, wherein like reference characters indicate like parts:

FIG. 1 is a perspective view of the analyzer;
FIG. 2 is a sectional view through the analyzer;
FIG. 3 is an enlarged full size fragmentary sectional view of the filter and screen turrets;
FIG. 4 is a plan view of the color filter turret;
FIG. 5 is a sectional view taken substantially on the line 5—5 of FIG. 4;
FIG. 6 is a plan view of the screen turret;
FIG. 7 is a section taken on the broken line 7—7 of FIG. 6; and
FIG. 8 is a sectional view taken substantially on the line 8—8 of FIG. 2.

Referring to the drawings there is shown a portable casing 20 adapted to be placed over color prints or negatives in regard to which color analyzing is to be effected. The casing is provided with handles 22 and has an inclined upper deck 24 over which are arranged a color disk turret 26 and a half tone screen turret 28. Above the turrets 26 and 28 is a plate 32 having an angle indicating scale 30 the indicia divisions of which are magnified twice. The plate 32 is provided with an aperture 34 having an optical glass window 35. To the rear of the housing 20 is pivotally attached as at 37, an arm 39 on which is slidably mounted as at 36 a light shield 38 with a viewing lens 40. Any height may be selected by loosening the clamp screw 41.

The housing base plate 42 is provided with spaced nylon strips 44 which may be laid upon a color print or negative without danger of injury thereto. The base is provided with an aperture 46 adapted to be placed over an area of a color print or the like to be analyzed. Such aperture 46 is provided with a high intensity illumination means 48 including a projection type incandescent lamp 49 mounted in an inclined manner within the lower part of the housing as is indicated in FIG. 2. The beam of the lamp is directed at the aperture 46 through a diffuser 47. The lower portion of the housing is also provided with a blower motor 50 driving a blower 52 which intakes through a circular louvered inlet 53, on one side, and exhausts through a similar louvered exhaust outlet 54. The blower discharges as at 55 into lamp area 57 below plate 59 to dispel the heat thereof. A transformer 43 may be located in the lower part of the housing and supply low voltage to the lamp 49. An electrical circuit, not shown, actuates the blower and energizes the incandescent lamp and is controlled by a switch as at 58.

Within the mid portion of the casing is a light transmission assembly 60 having reflectors 62 and 64 on opposite sides of a lens system 63 having a 1 to 1 ratio with full compensation against aberration, a flat field and no distortion. The lens system 63 as shown, is disposed on a horizontal axis and reflector 62 is arranged on a 45° angle. The reflector 64 is disposed on an angle such that light transmission will be directed upwardly on an angle and along the axis A of the viewing lens 40 and through the approximate center of the circular aperture 34 in the plate 32.

The casing is provided with an inclined deck 24 having a circular aperture 70 aligned with the axis of the viewing lens 40. Such circular aperture may have a clear optical glass 72 cemented in place to seal the casing against entrance of dust. Centrally of the deck 24 there is provided a bearing 74 for a shaft 76 extending normal to the deck. Secured to the shaft 74 is a sungear 78, as by a set screw 80, and below the deck there is secured to the shaft a beveled gear 81. The beveled gear 81 meshes with a beveled gear 82 affixed to a transverse shaft 84 extending outwardly through the housing to a manual knob 86. The beveled gear 81 bears a ratio to beveled gear 82 of 2 to 1.

Freely rotatably mounted on the shaft 76 is a circular screen turret assembly 88 having a knurled peripheral edge 90 with a centrally annular groove 92 with notches 94 disposed around the periphery at 90° spacings. A detent screw 96 having a spring pressed ball rides in the groove 92 and is adapted to yieldingly hold the disk or turret 88 in any one of four positions, when one of the notches 94 is engaged by the ball. The turret is adapted to be rotated manually by reason of its peripheral knurled side edges being exposed on either side, for example as is shown in FIG. 1. The turret is provided with four circular apertures 100 equally spaced around the turret disk, such apertures having an annular shoulder 102. Disposed above each aperture 100 and upon the annular seat formed between the aperture 100 and shoulder 102 are a plurality of bezels 104 having peripheral gear teeth 106, and a dark circular screen 108 suitably cemented in an annular groove on the underside, and in the inside wall of the bezel.

As shown in FIG. 6 the annular shoulders 102 appear on the inside faces of the lands 110 disposed outwardly of and between the adjacent bezels 104. The bezels are rotatably disposed in each of the shoulder apertures 100 and secured in place by a cover plate 112 disposed above the bezels and secured to the lands 110 as by screws 114. The cover plate is provided with circular openings 116 substantially in alignment with the apertures 100 in the turret body member, and an annular shoulder 117 of each bezel projects up into one of the apertures 100, to center the bezel. Each screen comprises a circular piece of optical glass having its underside provided with a half tone dark screen.

As can be seen in FIG. 3 the cover plate 112 has a central aperture to accommodate the hub of the sungear 78 secured to the shaft 76, and the sungear 78 meshes with the peripheral teeth of each of the four bezels 104. The pitch circle of the sungear teeth is ½ that of the pitch circle of the bezel gear teeth, so that a ratio of 2 to 1 is established.

Disposed above the screen turret assembly is a washer 120 and thereabove is a color turret assembly previously refered to as 26. The color disk assembly 26 comprises a disk 122 having a knurled periphery 124 with a central groove 126 and four peripheral notches 128 disposed at 90° from one another around the periphery. A second ball detent 130 mounted in an adjustable screw 132 rides in the groove 126 and is adapted to hold the disk yieldingly from rotation when one of the grooves 128 is engaged by the ball detent 130. The disk 26 is manually rotated through the exposed knurled edge on either side, one side being indicated in FIG. 1. The color turret 26 is somewhat smaller than the screen disk 28 to facilitate the selection of one or the other disks for rotation by finger application. The color disk is provided with four circular shoulder recesses in which are cemented four circular optical glass windows, one of which is transparent glass and the other 3 of which may be green, red and blue, 133, 134, 135 and 136 respectively.

The screen turret assembly as previously described includes four bezels 104 provided with half-tone screens of varying pitch such as 150, 133, 120 or 85 to the inch, the opaque dots of which are disposed on lines extending at right angles to each other and the intensity of which is such as to provide a dark screen having a density of greater than 95% and preferably as high as 99½% and such that the pin hole openings for light transmission are of an order of about .0007 to .0010 inch in diameter. The axes along which the dots are arranged on each of the screen disks will preferably be parallel to the axes of the dots of the other disks so that upon rotation of the turret assembly so as to bring any one of the screen disks into alignment with the axis of the viewing lens if the knob 86 is held, or if left free to turn, the screen angle will be the same as each turret reaches alignment with axis A for each screen. This will result from the timing relation between the peripheral gear teeth of the bezels in meshing with the sungear 78.

It will be seen that the shaft 76 is manually rotated by the knob 86. When the turret assembly 28 is disposed in any one of its four positions, as determined by the engagement of a notch 94 with the ball detent 98, the screen angle of all four screen bezels may be rotated in unison by rotation of the knob 86. Thus if the screen angle of the disk in alignment with the viewing lens is rotated a few degrees to the left or the right, the screen angle of the remaining three disks will likewise be rotated by a smaller angle. The half tone screen, on the underside of each of the screen bezels will lie at the same optical distance from the lens assembly 63, as the lens assembly is spaced from the plane of the under surfaces of the nylon strips 44.

The color turret and the screen turret are pressed together by a resilient dished washer 140 bearing against the under side of the cover plate 32 through washers 142 disposed on top of the color turret 26. The upper end of the shaft 76 is provided with a knob 150 having a pointer 152 of a suitable length for cooperation with the indicia on the scale 30. Such knob and pointer are frictionally mounted on the shaft 76 between a split washer 154 disposed in a groove in the shaft 76, and a second split washer 156 on the upper end of the shaft bearing against the knob through a spring washer 158. By reason of the indicia having a scale double that of an ordinary protractor scale, the pointer will indicate degrees, by reason of it being adapted to swing with rotation of the sungear whose pitch diameter is ½ that of the bezel gear teeth. Thus the pointer indicates the number of degrees of rotation imparted to the bezels having the half tone screens.

In order to make an analysis of a given color in a particular area, the apparatus is placed over the color print, with the area to be studied located centrally with respect to the aperture 46. The blower and lamp are turned on and the print illuminated. The light from the lamp is shielded by the tubular shroud 51. The blower tends to slightly elevate the pressure within the lower part of the housing, which tends to cause the print to lie flat on the table. If the dot periodicity used in the various colors of the print be known, and for example is 120 to the inch, the operator will set the turret or color wheel 26 with its clear glass in alignment with the axis A, and the operator will then rotate the turret 28 to bring the screen having 120 lines to the inch in alignment with axis A. Thereafter, by rotating the knob 86, the 120 pitch screen will be rotated. By observing, through the viewing lens 40, as the 120 screen is rotated, the alignment of the apertures in the screen with one of the colors of the print will be observed, by the gradual appearance of dots of increasing size as actual alignment is approached and reached, whereat the apparent dots become infinite in size and infinitely spaced. By rotating the screen about two degrees as indicated on the scale 30, in either direction, from the alignment position where the dots suddenly disappear, dots will reappear, with a spacing of about a quarter of an inch, and the size of the dots of the particular color will seem to vary with the color strength of the individual dots, as will the intensity. Since the alignment of the other colors is so far from the angle of the screen, the dot size of the other colors are too small to be noticeable, and so blended with the other colors, except the one under observation, as to provide a diffused background.

If the dot periodicity of the various colors of a print are unknown, the screen turret can be quickly shifted to each of the four positions, and at each position the screen rotated through a sufficient angle to pass at least one color dot axis. Observations during this procedure with each screen will indicate interference magnification whereat the apparent dots and the apparent spacing increases to a critical infinite effect, indicative of alignment, if the particular screen being used has the same periodicity as the color dots on the print. Assuming one of the screens has the correct periodicity corresponding to that of the print, the turret will be left in that position, while the bezel having the screen will be rotated by knob 86 to locate the color angles of the print. Since the pointer 152 is frictionally secured to the shaft 76, as one color angle is located, the pointer may be set at zero, and after rotation of the knob 86, when the angle of another color is located, the angle between the two colors will be indicated on the scale 30. A stop pin 153 prevents the pointer from rotating beyond either end of the scale which extends 60 degrees in either direction so as to cover a 90° angle in an ample manner.

In order to render the analyzer more effective in examining a particular color, the color disk may be rotated to bring any one of the color disks into alignment with the viewing axis A. For example to examine the yellow dot structure, the blue filter is used, to examine red, the green filter is used, and to examine blue, the red filter is used. In each case the dot structure of the particular color being examined, is interference magnified by use of the appropriate screen, and such viewing may be improved by viewing through the appropriate color disk.

While the screens have been referred to as "half tone" screens, the actual screens are dark screens having apertures in the order of .0007 to .0010 inch in diameter. It will also be seen that the optical axis A extends from normal from the plane of the bearing surfaces of the nylon strips to the reflector 62, through the axis of the lens assembly to the reflector 64, and thence normal to the half tone screen and in alignment with the axis of the viewing lens, and the optical distance between the plane of the bearing strips 44, to the optical center of the lens system will preferably equal the distance from the center of the lens system to the plane of the half tone screen.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a lithographic color analyzer, a base having a viewing aperture therein and means for establishing a viewing plane for a lithographic print or the like, a casing disposed above said base, having an inclined deck disposed above said base, a pair of turret disks pivotally mounted on said deck, one of said turret disks having at least two dark half tone screens rotatably mounted therein and of different periodicity and a density as greats 99½ %, means for rotating said turret disk to move either of said screens into a single common plane, a lens system having a 1 to 1 ratio with full compensation against aberration, a flat field and no distortion disposed within the casing on a substantially horizontal axis, a reflector disposed above the aperture and in alignment with and on one said of said lens system, and a reflector below said deck in alignment with and on the other side of said lens system, said reflectors and lens system being disposed on an optical axis extending normal to the viewing plane and normal to the said plane of said half tone screens, the optical distance between the viewing plane and the optical center of said lens system being the same as the optical distance from the lens system center to said half tone screen plane, means in said casing for illuminating the viewing plane through said aperture, forced air circulating means for cooling said casing and establishing an above atmospheric pressure therein, color filter disks disposed in said other turret, a viewing lens disposed above the deck and the dark screen plane, means for rotating each of said turret to locate a screen and a color filter in the optical axis, means for manually rotating the half tone screens relative to the turret in which they are mounted, and a dial indicator above said deck and actuated by said last named means for indicating the angle of rotation of the half tone screen relative to its turret when actuated by said manual rotating means.

2. An analyzer in accordance with claim 1 wherein the manual means for rotating the half tone screens relative to the turret comprises planetary gearing including a sun gear mounted on the turret axis and bezels for each half tone screen having peripheral gear teeth in mesh with the sun gear.

3. An analyzer in accordance with claim 2 wherein the sun gear is affixed to a shaft on which the turret is rotatably mounted, and on which the dial indicator is frictionally mounted.

4. A lithographic color analyzer comprising, in combination:
   (a) a base having a viewing aperture therein and means for establishing a viewing plane for a lithographic print or the like;
   (c) a casing having an inclined deck disposed above said base;
   (c) first and second turret disks rotatably mounted on said deck;
   (d) at least two half tone screen of different periodicity mounted on said first turret disk for rotation therewith and for independent rotation with respect thereto;
   (e) at least two color filter disks mounted on said second turret disk for rotation therewith;
   (f) first means for independently rotating each of said turret disks to place a selected one of said screens and a selected one of said filters in superposed relation in registration with said viewing aperture, whereby a print positioned in said viewing plane may be viewed through said selected screen and filter;
   (g) second means for rotating said selected screen relative to said first turret disk while maintaining its registratoin with said viewing aperture; and
   (h) a dial indicator actuated by said second means for indicating the angle of rotation of said selected screen relative to a reference position.

5. The invention according to claim 4 and further including means for setting dial indicator independently of actuation thereof by said second means.

6. The invention according to claim 5 wherein each of said half tone screens is mounted in a bezel and said second means comprises a manually engageable member connected to said bezel for rotation thereof independently of said first turret disk.

References Cited
UNITED STATES PATENTS

| | | | |
|---|---|---|---|
| 2,404,888 | 7/1946 | Richards | 350—89 |
| 3,109,239 | 11/1963 | Wicker et al. | 350—150 |
| 3,462,229 | 8/1969 | Wicker | |

WILLIAM L. SIKES, Primary Examiner

O. B. CHEW II, Assistant Examiner